Oct. 14, 1947.  C. J. CROWLEY  2,429,121

METHOD OF MAKING RUBBER GOODS

Filed June 17, 1942  3 Sheets-Sheet 1

Inventor
Cornelius J. Crowley
By Rockwell & Bartholow
Attorneys

Oct. 14, 1947.                C. J. CROWLEY                2,429,121
                    METHOD OF MAKING RUBBER GOODS
                     Filed June 17, 1942         3 Sheets-Sheet 2
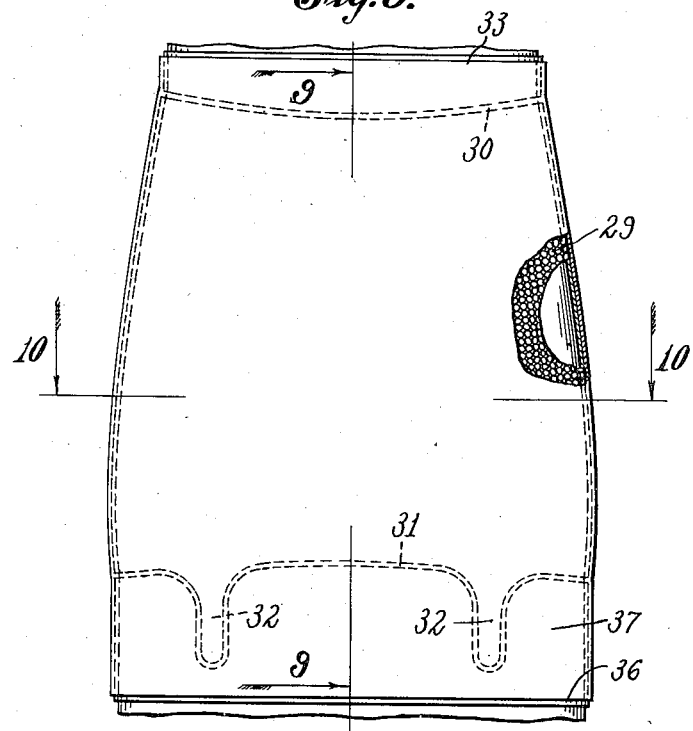
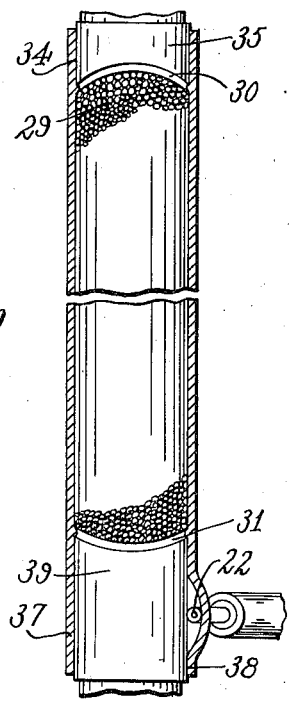
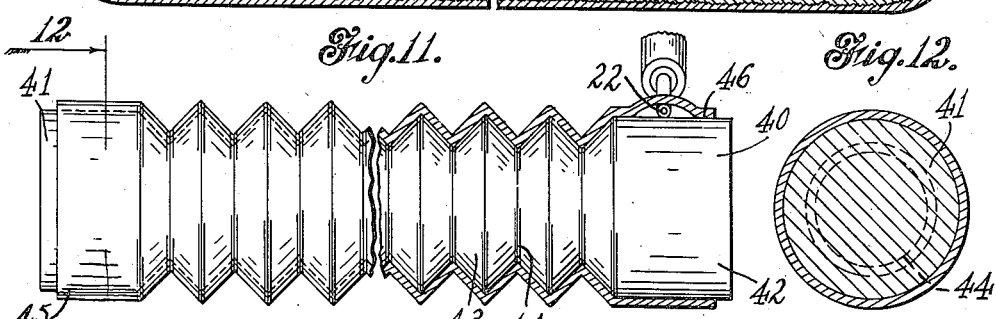
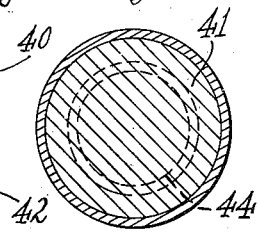
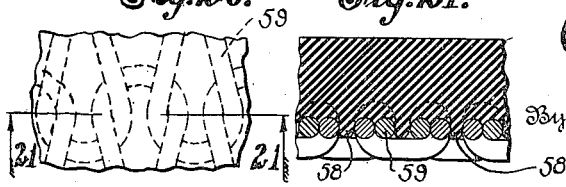

Oct. 14, 1947.  C. J. CROWLEY  2,429,121
METHOD OF MAKING RUBBER GOODS
Filed June 17, 1942  3 Sheets-Sheet 3
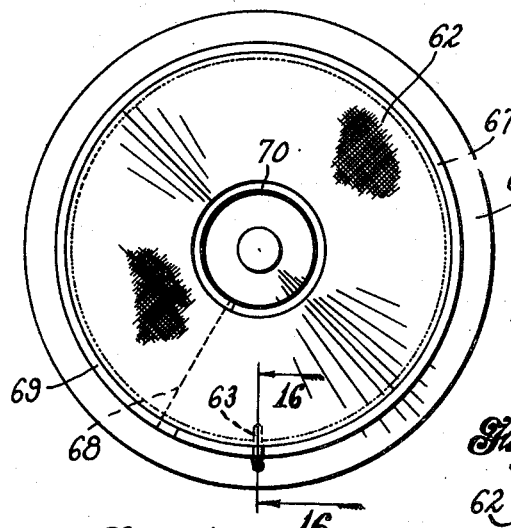
Fig. 13.
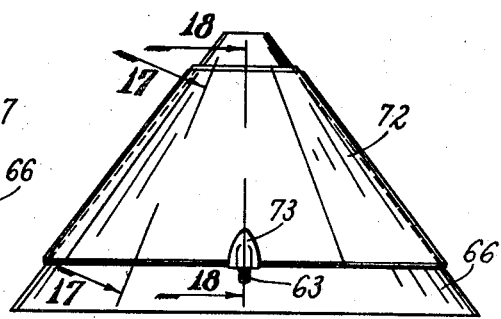
Fig. 15.
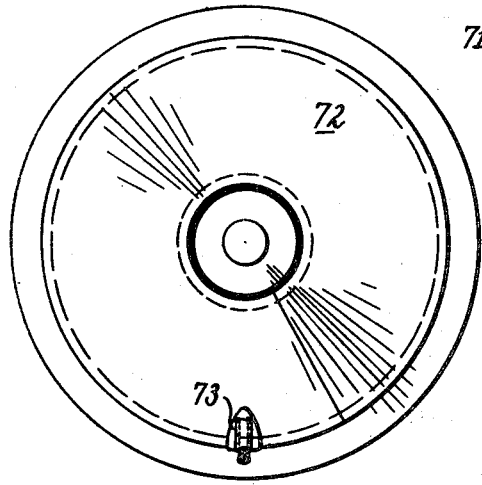
Fig. 14.
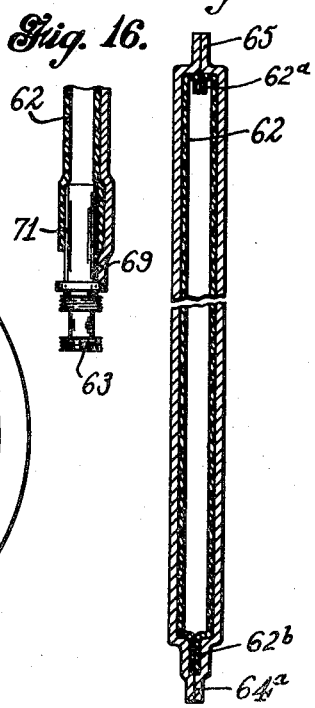
Fig. 16.  Fig. 17.  Fig. 18.
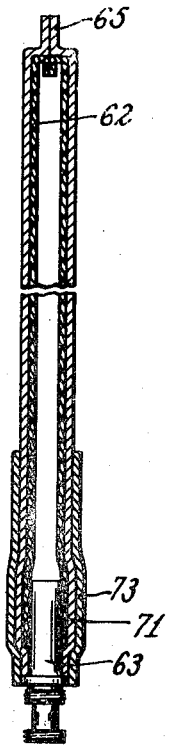
Fig. 19.
Inventor
Cornelius J. Crowley
By Rockwell & Bartholow
Attorneys Patented Oct. 14, 1947

2,429,121

UNITED STATES PATENT OFFICE 2,429,121

METHOD OF MAKING RUBBER GOODS

Cornelius J. Crowley, New Haven, Conn., assignor to The Seamless Rubber Company, New Haven, Conn., a corporation of Connecticut Application June 17, 1942, Serial No. 447,365

24 Claims. (Cl. 154—83)

This application is a continuation in part of my application Serial No. 359,669, filed October 4, 1940.

The invention relates to a novel method of making various articles of natural or synthetic rubber or rubber-like material. By this method bathing caps, girdles, gloves, invalid cushions, ice bags, water bags, and various other articles of irregular or regular shape can be made. In certain aspects the invention is particularly concerned with irregularly shaped articles of rubber, in which a textile liner, layer or reinforcement is a part of the wall structure. In some aspects of the invention, also, the latter is concerned with the ornamentation of the surface of the rubber article.

The production of rubber articles by blowing in hollow molds is complicated and expensive. There is considerable difficulty in forming the rubber wall against the inner surface of a hollow mold, and the apparatus required, which usually includes an inner core, is expensive to purchase and to operate.

One of the objects of my invention is to simplify and cheapen the process of production.

Another object is to provide a method in which for the manufacture of many products light-gauge sheet rubber stock can be successfully employed as the starting material.

Another object is to shape the walls of rubber articles in a novel and improved manner.

Still another aim is to provide an improved process adapted for the application to the wall of the rubber article of an ornamental pattern in relief, very sharply defined.

Another purpose is to provide an improved process for the production of rubber articles with textile linings, and an improved lined product.

To these and other ends the invention consists in the novel steps, procedures and features hereinafter described and claimed.

Figs. 8, 9 and 10 illustrate the process as applied to the manufacture of rubber girdles, Fig. 8 being a front view showing the blank applied to the form, with certain parts broken away, Fig. 9 being a section on line 9—9 of Fig. 8, and Fig. 10 being a section on line 10—10 of Fig. 8;

Figs. 11 and 12 illustrate the process as employed in connection with the manufacture of rubber tubing of the accordion type, Fig. 12 being a section on line 12—12 of Fig. 11;

Figs. 13, 14 and 15 illustrate the manufacture of an invalid cushion of round shape having a rubber wall with an inner textile liner, Figs. 13 and 14 being top plan views, and Fig. 15 being a side elevation, illustrating the use of a form of conical shape;

Figs. 16, 17 and 18 are, respectively, sections on lines 16—16 of Fig. 13, and lines 17—17 and 18—18 of Fig. 15;

Fig. 19 is an edge view of the completed cushion showing it in fully inflated condition; and Figs. 20 and 21 are details showing the wall of fabric and rubber.

Figure 1:
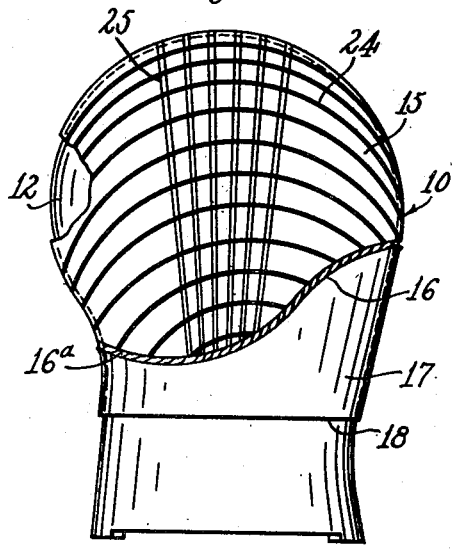
Fig. 1 shows in side elevation a form such as used in making a rubber bathing cap having an ornamental pattern in relief.
Figure 2:
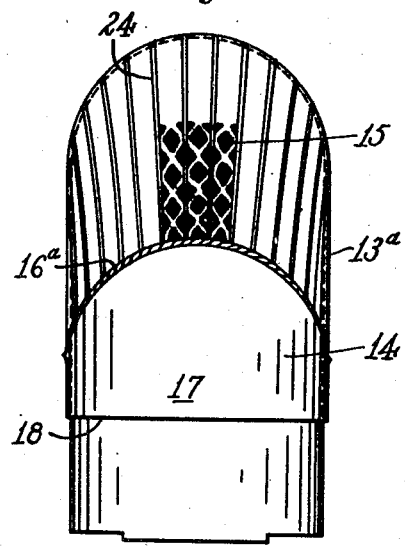
Fig. 2 is an end view of the form.
Figure 3:
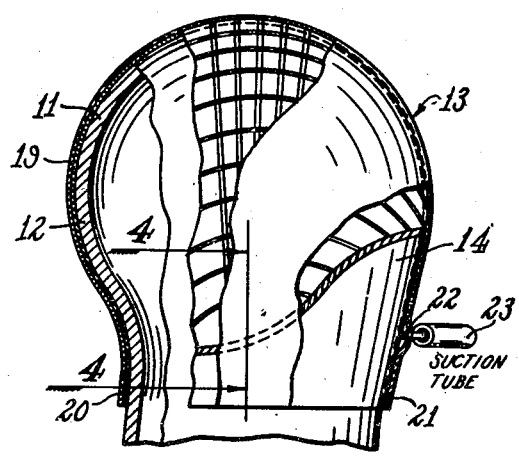
Fig. 3 is an elevational view partly in section showing the blank applied over the form and the air being exhausted from the space between the blank and the form.

In the manufacture of ornamented bathing caps, a form 10, such as shown in Figs. 1, 2 and 3, is preferably provided, this being made hollow and provided with a relatively thin metal wall 11 cast in a shape to give the cap formed thereon the desired contour. In the case illustrated, where the form is used for making a so-called head-shaped cap, the upper part of the form is of greater longitudinal than lateral dimension, and provided at the rear with a curved overhanging portion 12 corresponding to the back part of the head. At the front the portion 13 shapes the forehead portion of the cap, and from this portion of the form the latter slants downwardly and inwardly in a gradual manner, so that at the front of the form there is a gradual and slight overhang. On the other hand, I prefer to have the sides of the form at and near the center go up substantially straight for an appreciable distance from the base part, as will be observed from Fig. 2, and as indicated by reference character 13ª, although at the top, of course, the form is rounded in simulation of the human head.

The form as thus provided may have the ornamental design to be imparted to the finished cap engraved directly therein, but I prefer to employ a separate element carrying the design or pattern. Also I prefer that this separate element carry, in addition to a surface coextensive with the finished cap, a surface adapted to receive a lower extension on the cap, which extension is later trimmed off, as hereinafter described. I prefer to use on the form a pattern-carrying element 14 of hard rubber. This element has on its exterior surface a design in relief of any desired kind or character, such as the design 15 indicated in the drawing, this design or pattern extending down to the line 16, which defines the lower boundary of the finished cap. Adjacent this line, in this particular case, is a groove 16ª intended to form a bead at the lower margin of the cap, but such bead is unessential, and various modifications in this respect may be made. Below what corresponds to the cap boundary the pattern-carrying element has a lower extension 17, which is left smooth and which extends straight down at the sides of the form and somewhat inwardly at the ends, until the lower boundary 18 of the pattern is reached. The hard rubber of the pattern element is adapted to carry a sharply defined bas relief design, and to impart the same design to the finished cap in a manner hereinafter described. Usually the design, which is only partially indicated in Fig. 2 at 15, extends over the entire cap area. In order to hold the pattern-carrying element properly in place, it may be adhesively secured to the external surface of the form.

In manufacturing a cap I use relatively thin stock of sheet rubber. Such sheet stock is made up while in the soft unvulcanized condition into a cap-like article 19, shaped to approximate the shape of the upper part of the form 10. This unvulcanized article or blank can be made advantageously of two or more parts. I prefer to make it in three parts, one of which is a central or median part of some width, extending continuously from the back of the neck to the boundary of the forehead portion of the cap, and the other two parts being side parts, which, with the part above mentioned, complete the cap structure. These parts are attached to each other in any suitable manner, as by overlapping and adhesively securing their adjacent edges. It will be noted that this roughly formed unvulcanized article has a lower portion, indicated at 20 in Fig. 3, which conforms to and is practically coextensive with the lower extension of the pattern-carrying element 14. At its lower part, where the underlying form 10 is directed slightly inwardly and downwardly, the uncured blank conforms to, or is hand-manipulated to conform to, the form.

Figure 4:
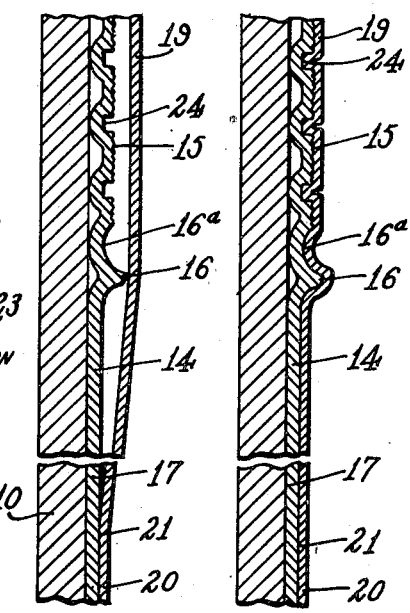
Fig. 4 is an enlarged section taken on a line corresponding to the line 4—4 of Fig. 3, showing a portion of the rubber wall as it appears before it is conformed to the form.

The next step is to create an air seal between the lower extension of the pattern-carrying element and the lower extension of the blank, and this may be done in various ways, for example, by introducing a suitable adhesive between the blank and the pattern-carrying element throughout the rims or mouth portions thereof, as indicated, for example, at 21 in Fig. 3, so that at no point in the lower rim or edge of the blank can there be escape of air. The next step is to evacuate the space between the form and the blank. To do this, I prefer to insert through the wall of the blank at a point slightly above the lower sealed portion and in the lower extension of the blank (for example, in the location shown in Fig. 3) a hollow needle 22 connected to a flexible tube 23, which in turn is connected to a suction pump or other air-exhausting means, not shown. Air being sucked out of the space between the form and the inner surface of the blank so as to create a partial vacuum, the wall of the blank is sucked or drawn inwardly from its initial position, indicated in Fig. 4, wherein it is somewhat spaced from the surface of the form, so as to make contact with and conform to the form as shown in Fig. 5.

Figure 5:
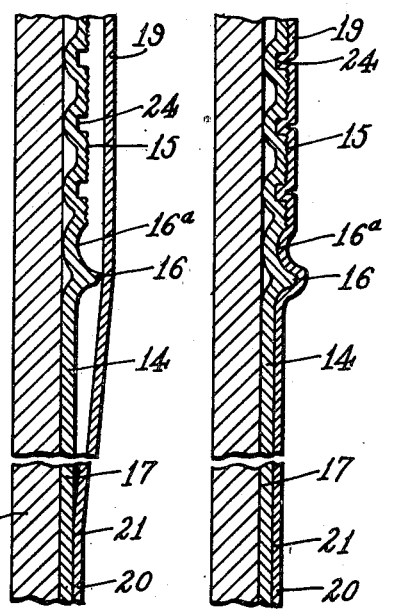
Fig. 5 is a view similar to Fig. 4, showing the wall of the blank after it has been conformed to the form.

When the condition shown in Fig. 5 is reached, practically all of the air has been drawn out of the space between the blank and the form, and the wall of the blank of uncured rubber has been shaped to take the shape of the form, thus giving the desired contour to the cap, and the rubber of the blank wall has been pressed by the greater external pressure of air into all of the cavities of the ornamental pattern on the form provided for the ornamentation of the cap. The cavities of the pattern will be fully filled so as to produce a sharply defined pattern on the blank, this latter being the "positive" of the design, whereas that on the pattern element is the "negative."

In doing this work I prefer to use a suction or partial vacuum of the order of twenty-six inches, as this has been found to give very satisfactory results.

In order to facilitate the exhaustion of the air from the space between the form and blank through the hollow needle, with only one such needle being necessary, I prefer to employ an ornamental design of such a nature as to facilitate movement of air over the pattern face in the direction of the needle when suction is applied, and to avoid formation of isolated pockets or cavities in the pattern which are calculated to occlude air and thereby prevent the cavities of the pattern from being filled completely by rubber. In the design selected for illustration, it will be observed that in the "negative" on the pattern element there is a series of approximately parallel shallow arcuate grooves adapted to serve as air passages and adapted to vent the intervening areas of the design, said grooves being indicated at 24, and I may also use slight venting grooves intersecting these grooves 24, as indicated in Fig. 1 at 25. This showing, however, is merely by way of example. If the lower margin of the groove 16ª be found to offer too much obstruction to air being vented, such margin may, if desired, be interrupted at intervals, or the margin of this groove may be less pronounced than as shown in the drawings.

The suction through the needle may be exerted during a period of, say, one minute where the degree of vacuum is approximately that given above, namely, twenty-six inches. After the needle has been removed, the needle opening is closed by pressing over it a small lump of uncured rubber, so that the condition of partial vacuum will be maintained. The form is then put aside and the blank on it left to rest or set. After the exhaustion of air has ceased, the relatively soft rubber in the blank tends to work or set into the cavities, and this secures a very sharp definition of the pattern. The setting time may be, say, a few hours. After this the blank is stripped off of the form, placed on a plain form, and vulcanized by heating. I prefer to incorporate a suitable vulcanizing agent in the stock so that the article can be vulcanized by the application of heat while on a suitable form, but the vulcanizing can be done in other ways. The stripping off of the blank from the form is not interfered with by the adhesive sealing of the blank to the pattern element, because the adhesive between them is not sufficiently dry or set to prevent stripping. However, I do not limit myself to the use of interposed adhesive or cement for the purpose of sealing off the space extending up to the edge portion of the blank.

Figure 6:
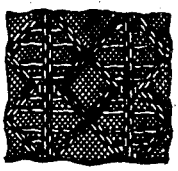
Fig. 6 is a fragmentary outside view of a portion of the completed cap.
Figure 7:
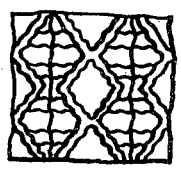
Fig. 7 is a view of the same portion looking from the inside.

After vulcanization the so-called lower extension on the blank, that is, the part below the finishing bead or the like, can be readily cut off. The surface of the blank which has been in contact with the pattern is of course used as the external surface of the cap, this being shown in Fig. 6. The pattern may simulate certain forms of woven or knitted textile material, but of course various patterns can be employed. The inner surface of the completed cap is shown partially in Fig. 7, the same being roughened somewhat, but not to an objectionable extent, by the flowing of the rubber into the form cavities in the manner previously described.

In some cases I may wish to cure the cap on the original form rather than on a plain form.

In Figs. 8 to 10, inclusive, I have illustrated steps in the manufacture of a one-piece rubber girdle having on its external surface an ornamental design in relief. Generally the procedure is as above described in connection with the manufacture of bathing caps, but in this instance, the article not being pouch-shaped, it is necessary to seal off at the upper end as well as at the lower end the space immediately beneath the wall of the blank. The rubber girdles are brought to final shape and have the ornamentation applied by the use of a generally rounded form adapted to be encircled by the blank of thin uncured sheet stock, which is circumferentially continuous, and to a portion of the external surface of this form the negative of the ornamental pattern may be applied in a manner similar to that previously described. The circumferentially continuous blank is made up from two or more pieces of uncured sheet rubber stock of fairly light gauge. The pieces may have their adjacent edge portions overlapped and adhesively secured to each other, as in the case of the bathing cap. Before application to the form, the blank has a shape roughly approximating the final shape, as before.

In the drawings, the girdle form is shown at 26, and the same may be constituted by a solid piece or block of suitable material. In this particular instance the form is rather shallow in depth, that is, from front to rear, but at the sides it is provided with gradually rounded side portions or edges, indicated at 27, which are curved or sloped to give the proper shape over the hips. On the block 26 is placed an exterior layer 28 of hard rubber or the like, carrying an external pattern in relief, such as indicated, for example, at 29. At its upper part the form is provided with an encircling groove 30 marking the upper line of the girdle, and at its lower part the form has a similar groove 31 establishing the lower margin of the finished article. The groove 31 may be shaped to present the bent formations 32 at both front and back of the form, and by the use of such formations the girdle may be provided with integral rubber tabs or extensions for attaching hose supporters.

In the drawings, the operation is shown at a stage in which the uncured rubber blank is drawn to and shaped against the external surface of the form by the utilization of a partial vacuum in the manner previously described. The upper edge of the blank is indicated at 33, and it will be noted that this edge is extended upwardly somewhat beyond the groove 30. Between the edge 33 and the groove 30 the space at the under surface of the blank is sealed off in a suitable manner, as by an adhesive introduced in the region generally indicated at 34, so as to adhesively secure the upper edge portion of the blank to a circumferential portion of the form, which latter portion is indicated at 35. The lower edge of the blank is indicated at 36, and it will be seen that the blank has at its lower part an integral extension 37 extending from the groove 31 to this edge 36. In the case illustrated, only a portion, that is to say, the lower portion of the extension 37, is used for sealing off the space at the under or inner surface of the blank, this sealing off being accomplished, for example, by inserting adhesive material in the marginal region indicated generally at 38, the adhesion being between the marginal portion at the lower part of extension 37 and the convex smooth portion 39 provided on the lower end of the form and corresponding to portion 35, above mentioned. It is preferred to use the lower extension 37 for perforation by the suction needle, as in the case first described, and it will be seen from Fig. 9 that the needle 22 is employed in substantially the manner hereinbefore described.

After the blank has been formed, and has set sufficiently, it is vulcanized, stripped off and trimmed. It may, however, be vulcanized on a different form.

In Figs. 11 and 12 there is illustrated the application of my improved process to the manufacture of rubber tubing of the accordion type, in which the wall of the tube in longitudinal section follows a zig-zag course. This is another case where the finished article is open at opposite ends and where the wall is shaped against the outside of a suitably shaped form. In this case the form has the character of a mandrel 40 made of suitable material and having cylindrically shaped ends 41 and 42 between which extends a shaped portion 43 which will impart to the blank the desired contour, which in this instance is one where transverse valleys and ridges alternate. For producing this result the intermediate portion of the mandrel is provided with a plurality of transverse V-shaped grooves 44. Figs. 11 and 12 show the rubber blank of sheet or other appropriate rather thin-walled rubber stock after it has been shaped to conform to the mandrel. Initially the blank throughout its length is substantially cylindrical or tubular, and it is then applied to the mandrel and roughly shaped so as to approximate the final shape by pressing it firmly against the exterior surface of the mandrel so that it will approximately conform to the mandrel. The end portions of the tube are then sealed to the mandrel, as by the use of adhesive in the regions generally indicated at 45 and 46. A suction needle 22 is then inserted through the rubber wall near one end of the tube, for example, the right-hand end, as shown in Fig. 11, and the air between the tube wall and the external mandrel surface exhausted so as to cause the wall of the tube to adhere closely to the external surface of the mandrel. Then, after setting for a period, as in the previous cases, and after vulcanization effected directly upon the mandrel, the tube is stripped off and the ends trimmed.

My improved process is also applicable to the manufacture of various hollow articles of rubber provided with textile or other pervious linings bonded to the rubber wall. For example, an invalid cushion such as shown at 61 in Fig. 19 can be made by this process. This particular article shown in the drawing is a round invalid cushion, which when inflated is of doughnut shape. It is provided with an interior fabric liner 62 (see Figs. 17 and 18) of stockinet, for example, and has an inflating valve 63 located at a point in its outer periphery. The finished article is characterized by a solid outer peripheral flange of slight lateral extent, this flange being indicated at 64. The flange constitutes an integral portion of increased cross-sectional area extending along the margin of the article; otherwise the covering of rubber over the liner is, at least substantially throughout the covering, a layer of substantially uniform thickness. In incomplete form the flange 64 is shown in Fig. 17 at 64ᵃ. Within the hole of the doughnut is a similar flange which in incomplete form is shown in Figs. 17 and 18 at 65.

In making this cushion, it is preferred to employ a form 66 which is of conical shape and which is rested upon a table or other suitable support, not shown. An uncured sheet 67 of rubber which has been cut into the shape of a ring, open at one point, is first placed on the form, and at the open part of the ring the rubber is slightly overlapped, as indicated at 68, preparatory to the formation of a continuous annular ring. The next step is to place on top of the rubber sheet an annular liner 62 of stockinet or other suitable fabric which has previously been made into a complete ring of the proper size, said ring also being properly shaped to fit the sloping side of the conical form 66. Preferably the liner is made of two annular pieces of fabric sewed together at the inner and outer edges of the liner. At one edge of the liner, for example, the inner edge, the seam is turned inwardly, as indicated at 62ᵃ, but at the other edge the seam is turned outwardly, as shown at 62ᵇ. The liner does not extend completely to the outer and inner edges of the rubber sheet laid on the form, and thus outer and inner peripheral portions 69 and 70 of the sheet are left exposed. At this time the air valve part 63 may have its mouth portion inserted into a suitable opening 71 created in the outer periphery of the liner at one point, so that the valve bore is in communication with the interior of the liner, this being shown in Fig. 16.

The next step is to place on top of the liner a rubber sheet 72 of the same size as sheet 67, so that the portions at the outer and inner peripheries of sheet 72 will be in contact with the portions 69 and 70. Previously the liner will have been soaked with a suitable solvent, or solvent otherwise applied, to facilitate a bond between the fabric and the rubber. For example, before being placed on the form the liner may be wet by the application of naphtha solvent of say 68° Baumé. When the liner is laid on the rubber sheet, the solvent immediately commences the softening of the adjacent rubber, and then the upper rubber sheet is laid against the liner. The solvent may in some cases contain a small amount of rubber cement. The sheets are pressed together over the liner so that in their soft uncured condition and in the presence of the solvent (and sometimes a small quantity of cement) they are adhesively secured together face to face at the inner and outer peripheral portions of the blank to create joints or seams which will be airtight. In this manner there is formed an air seal completely around the marginal portion of the blank for preventing escape of air from the interior of the blank.

The next step is to attach a suction tube, not shown, to the valve 63 so as to exhaust the air from the interior of the blank. The liner, being made of stockinet or like material, is, of course, quite pervious, and the effect of the partial vacuum in the interior is to conform the soft rubber to the liner at the exterior of the latter. The rubber is sucked strongly against, and, in fact, partially into the openwork liner body. This operations is, of course, assisted by the previous softening of the rubber, as above described.

Before the suction is commenced, a small uncured rubber piece 73 is applied to the article around the valve in order to prevent any leakage. Figs. 15, 17 and 18 show the condition before suction is applied.

With a vacuum of say twenty-six inches, the rubber is strongly drawn into the interstices of the fabric. The suction time and the setting time are usually about as previously indicated. The suction created within the interior of the liner results in the sucking of the softened rubber into the body of the liner in the manner represented in Figs. 20 and 21. The degree of softening of the rubber and the degree of vacuum are so chosen as to draw the rubber well into but not through the textile body. A vacuum at the inner side of the liner provides cleared interstices into which portions of rubber readily flow in the form of sharply defined projecting portions or prongs. Prongs or pointed portions such as produced in this manner are shown at 58 in Fig. 21. In Figs. 20 and 21 the yarn of the knitted fabric is shown at 59. As shown, the fabric is a knitted fabric, but while this is preferable it is not essential in all cases.

By the process above described, a most effective bonding between the rubber and the liner is secured, and this is true even when the liner has extremely small interstices. Obviously the process as applied to articles having fabric liners is more simple and expeditious than the prior procedure in which fabric-covered rubber was cut into a number of separate pieces which were fitted and joined for the purpose of building up the composite wall of the article. By the present process much less labor is required and much less skill on the part of the operator.

In the process of vulcanizing or other following process necessary for toughening, fixing or setting the rubber wall, the material of the two-part rubber flanges at the outer and inner peripheries of the cushion flows together to create a one-piece flange or enlarged integral cross-sectional portion at the margin of the article. If the manufacture of the article is completed by vulcanization, this can, if desired, be effected while the article is upon the conical form.

It will be understood that the valve part 63 of the cushion, which is utilized in the suction step, is used later for the inflation of the cushion, the "valve insides" being inserted at a later stage.

It will be apparent that other lined articles such as ice bags, water bags, gloves, etc., may be made by this process.

In the example of the bathing cap and in the example of the girdle, the rubber wall is shaped to the form and ornamented in addition. In the case of the accordion tubing a convex or male member is again used as a form having an outer surface against which the uncured rubber wall is shaped, the sealing at opposite ends being substantially the same as in the case of the girdle.

In the case of the invalid cushion the rubber wall is shaped against the liner, which acts as a male forming element to which the rubber is conformed. The liner when suitably supported has sufficient rigidity to act as a forming element for the soft rubber when the latter is subjected to the partial vacuum. In all these instances a form is provided constituted by a male member having an external surface for shaping the rubber, and there is applied over the form in general conformity thereto a blank of uncured sheet rubber stock. There is then sealed off a space defined at the outer side by the blank wall so that the blank will be shaped as the air in said space is exhausted, after which the air is exhausted, and the blank permitted to set.

By my invention the necessity of employing hollow molds for blowing rubber articles of numerous kinds is eliminated, and production is facilitated and expense lowered. Much less skilled labor is necessary. The walls of the rubber articles can be formed in a very satisfactory manner from relatively light-gauge stock, and sharply defined integral ornamental parts, designs or patterns can be readily placed on the articles where desired.

As previously indicated, synthetic rubber or rubberlike material can be employed, and it is to be understood that as employed in the claims the term "rubber" in itself is broad and general rather than specific.

While I have described several examples of my new process, and several articles made thereby, it is to be understood that various other procedures and articles are under the contemplation of the invention in its broad aspects, and that various modifications and changes as regards the details can be made without departure from the principles of the invention and within the scope of the claims.

What I claim is:

1. The method of making shaped rubber articles which comprises providing a form constituted by a member having an external surface for shaping the rubber, applying over the form in general conformity thereto a blank of sheet rubber, sealing off a space defined at the outer side by the blank so that the blank will be shaped as the air in said space is exhausted, and exhausting the air from said space through a member introduced through the blank wall, after which the blank is permitted to set.

2. The method of making shaped rubber articles which comprises providing a form constituted by a member having an external surface for shaping the rubber, applying over the form in general conformity thereto a blank of uncured sheet rubber stock, sealing the blank at its marginal portion so as to seal off a space defined at the outer side by the blank, whereby the blank will be shaped to the form as the air in said space is exhausted, exhausting the air from said space through the blank wall, after which the blank is permitted to set, and vulcanizing.

3. The method of making shaped rubber articles which comprises providing a form constituted by a member having an external surface for shaping the rubber, applying over the form in general conformity thereto a blank of sheet rubber, sealing off a space defined at the outer side by the blank so that the blank will be shaped to the form as the air in said space is exhausted, and exhausting the air from said space by introducing thereinto through the wall of the blank a hollow suction member through which the air is drawn out, after which the blank is permitted to set.

4. The method of making shaped rubber articles which comprises providing a form constituted by a member having an external surface for shaping the rubber, applying over the form in general conformity thereto a blank of sheet rubber stock, sealing off a space defined at the outer side by the blank by sealing the marginal portion of the blank to an underlying part, whereby the blank will be shaped against the form as the air in said space is exhausted, and exhausting the air from said space by introducing into the interior of the blank at the marginal portion of the latter a hollow suction member through which the air is drawn out.

5. The method of making shaped rubber articles which comprises providing a form constituted by a member having an external surface for shaping the rubber, applying over the form in general conformity thereto a blank of sheet rubber stock, sealing off a space defined at the outer side by the blank by sealing the marginal portion of the blank to an underlying part, whereby the blank will be shaped against the form as the air in said space is exhausted, and exhausting the air from said space by introducing into the interior of the blank at the marginal portion of the latter a hollow suction member through which the air is drawn out, said hollow suction member being a piercing member projected directly through the rubber wall.

6. The method of making shaped rubber articles which comprises providing a form constituted by a male member having an external surface for shaping the rubber, applying over the form in general conformity thereto a blank of sheet rubber stock, sealing off a space defined at the outer side by the blank by sealing the marginal portion of the blank to an underlying part, whereby the blank will be shaped against the form as the air in said space is exhausted, and exhausting the air from said space by introducing into the interior of the blank at the marginal portion of the latter a hollow suction member through which the air is drawn out, said hollow suction member being a piercing member projected directly through the rubber wall in an extension of the blank which is later trimmed off.

7. The method of making bathing caps and similar articles, comprising providing a form carrying an exterior pattern in relief, placing a sheet stock blank of rubber over the form, sealing the lower marginal portion of the blank to its underlying part so as to prevent escape of air, and removing air from the space between the pattern and the overlying blank portion by inserting a suction needle through the blank wall at a point only slightly above the lower margin of the blank, the blank having a lower extension passing below the lower margin of the pattern.

8. The method of making rubber bathing caps and other articles of sheet stock which comprises providing a form of generally rounded shape having an external pattern in relief adapted to be encircled by a circumferentially continuous blank of thin uncured sheet stock, placing such a blank which is open at at least one end over the form so that said open end lies closely against the form, sealing off the space between the open blank end and the form, exhausting the air between the blank and the pattern through the use of a needle inserted through the blank wall in order to cause the wall of the blank to enter the cavities of the pattern, permitting the blank to set on the pattern, and vulcanizing.

9. The method of making bathing caps and other articles which comprises providing a form constituted by a male member having an external rubber-shaping surface, placing a sheet stock blank of rubber over the form, sealing the marginal portion of the blank to its underlying part so as to prevent the escape of air, and removing air from the space between the blank and the form by the use of a hollow suction member a portion of which is introduced into said space.

10. The method of making relatively thin-walled rubber articles having a pattern in relief formed in the wall thereof, which comprises providing a form carrying on its exterior a negative of the pattern in relief, placing a blank of uncured sheet rubber stock over the form in general conformity thereto, creating a seal between the marginal portion of the blank and the underlying portion of the form, then exhausting the air between the blank and the pattern through an opening provided in the blank wall, the blank being permitted to set in the cavities of the pattern, and vulcanizing the blank.

11. The method of making shaped rubber articles which comprises providing a form constituted by a male member having an external surface for shaping the rubber, applying over the form in general conformity thereto a blank of uncured sheet rubber stock provided with an end extension, sealing off the end extension against its underlying part, exhausting the air from the space under the blank wall by steps which include the introduction of a suction needle through the extension portion of the blank, the blank being permitted to set on the form, stripping it from the form, and then trimming off the extension portion.

12. The method of making shaped rubber articles which comprises providing a hollow pervious liner for the article having an external surface adapted to shape externally applied rubber, applying over the liner in general conformity thereto a blank of uncured sheet rubber, sealing off the interior of the blank, and exhausting the air from the interior by the use of a member extending through the rubber wall so that the air passes inwardly through the liner wall to draw the rubber against said wall and affix it thereto.

13. The method of making shaped rubber articles which comprises providing a hollow airpervious flexible liner, applying over the liner in general conformity thereto a blank having at opposite faces sheets of uncured rubber extending marginally beyond the liner, sealing off the interior of the blank by steps which include adhesively securing together the marginal portions of the sheets, and exhausting the air from the interior so that the air passes inwardly through the liner wall to conform the blank wall thereto making use of an opening provided through the blank wall.

14. The method of making shaped rubber articles which comprises providing a hollow pervious liner, applying over the liner in general conformity thereto a blank entirely enclosing the liner and comprising sheets of rubber adhesively secured together at their margins so as to seal the interior of the blank, and exhausting the air from the interior of the blank by steps which include the introduction of a hollow suction member through the rubber wall and into the interior of the liner, the blank being permitted to set after the exhaustion of the air has terminated.

15. The method of making shaped rubber articles which comprises providing a form constituted by a male member having an external surface for shaping the rubber, applying over the form in general conformity thereto a blank of sheet rubber stock, sealing off the space between the blank and the form by sealing a marginal portion of the blank to an underlying part, exhausting the air from said space by steps which include the thrust of a hollow suction member through the blank wall, and enabling the blank to set.

16. The method of making shaped rubber articles, which comprises providing a form constituted by a male member having an external surface for shaping the rubber, applying over the form in general conformity thereto a blank of sheet rubber, sealing off a space defined at the outer side by the blank so that the blank will be shaped as the air in said space is exhausted, piercing the blank to form a hole, and exhausting the air from said space through said hole.

17. The method of making shaped rubber articles, which comprises providing a form constituted by a male member having an external surface for shaping the rubber, applying over the form in general conformity thereto a blank of sheet rubber, sealing off a space defined at the outer side by the blank so that the blank will be shaped as the air in said space is exhausted, piercing the rubber wall to form a hole, exhausting the air through the pierced hole, closing the hole after the air has been exhausted, and enabling the blank to set.

18. The method of making shaped hollow articles of rubber having internal pervious linings, which comprises providing a hollow pervious flexible liner of a shape approximating that of the finished article, applying over the liner in general conformity thereto a blank of soft sheet rubber which encloses the liner on all sides, sealing the blank so that the enclosure of the liner is airtight, and exhausting the air from the interior of the blank by means of a hollow member introduced through the blank wall so that the air passes inwardly through the liner wall to draw the rubber against said wall and shape it thereto.

19. The method of making a shaped hollow rubber article having a hollow flexible pervious liner, which comprises providing such a liner having a shape approximating that of the finished article, applying over it so as to enclose it on all sides a blank comprising sheets of soft rubber extending marginally beyond the liner, adhesively interconnecting the sheets in face-to-face relation at their marginal portions so as to form an airtight space in which the liner is enclosed, and exhausting the air from the interior of the liner by means of a hollow member introduced through the rubber wall.

20. The method of making a hollow rubber article, which comprises providing a hollow textile liner, applying over the liner sheets of uncured rubber and interconnecting said sheets to enclose the liner in an airtight manner, and exhausting the air from the interior of the blank through an opening formed through the rubber wall in order to conform the rubber to the liner.

21. The method of making a hollow rubber article having a shaped wall, which comprises providing a hollow flexible textile liner of a shape approximating that of the finished article, applying over the liner sheets of uncured rubber which enclose it on all sides, interconnecting said sheets so as to enclose the liner in an airtight manner, and exhausting the air from the interior of the liner by means of a member introduced through the rubber wall so as to cause the rubber to be shaped to the outer surface of the liner.

22. The method of making a rubber article, which comprises withdrawing air from a space between a sheet of uncured rubber and a solid backing for the sheet by the use of a hollow suction needle piercing the sheet wall.

23. The method of making a rubber article having a design in relief in its wall, which comprises exhausting the air between a sheet of uncured rubber and a solid backing having a raised pattern on its surface through the use of a hollow suction needle introduced through the rubber wall.

24. The method of making a textile lined hollow rubber article, which comprises providing a hollow textile liner having a shape approximating that of the finished article, creating a covering layer of uncured rubber which encloses the liner in an air-tight manner, and exhausting the air from the interior of the blank to conform the rubber to the liner and affix it thereto, by the use of a hollow member introduced through the rubber wall, the blank while being exhausted being supported against a solid backing.

CORNELIUS J. CROWLEY.

REFERENCES CITED

The following references are of record in the file of this patent:

UNITED STATES PATENTS

| Number | Name | Date |
|---|---|---|
| 672,909 | Lefferts | Apr. 30, 1901 |
| 1,232,573 | Lee | July 10, 1917 |
| 1,263,462 | Payne | Apr. 23, 1918 |
| 1,389,485 | Price | July 8, 1919 |
| 1,310,436 | Roberts | July 22, 1919 |
| 1,433,971 | Roberts | Oct. 31, 1922 |
| 1,531,504 | Roberts | Mar. 31, 1925 |
| 1,592,536 | O'Neill | July 13, 1926 |
| 1,737,874 | Busch | Dec. 3, 1929 |
| 1,878,044 | Gilden | Oct. 23, 1934 |
| 2,007,548 | Sampson | July 9, 1935 |
| 2,012,927 | Hansen | Aug. 27, 1935 |
| 2,032,832 | Blair et al. | Mar. 3, 1936 |
| 2,048,475 | Slagle | July 21, 1936 |
| 2,233,174 | McDonald | Feb. 25, 1941 |
| 2,276,004 | Vidal et al. | Mar. 10, 1942 |
| 2,354,916 | Hurt | Aug. 1, 1947 |

FOREIGN PATENTS

| Number | Country | Date |
|---|---|---|
| 697,536 | Germany | Sept. 9, 1940 |
| 443,696 | Great Britain | Mar. 4, 1936 |
| 412,300 | Great Britain | June 28, 1934 |
| 494,885 | Great Britain | Nov. 3, 1938 |